United States Patent
Pillilli et al.

(10) Patent No.: US 12,210,649 B2
(45) Date of Patent: Jan. 28, 2025

(54) SECURING ATS FROM ROGUE DEVICES FOR CONFIDENTIAL COMPUTING

(71) Applicant: Microsoft Technology Licensing, LLC, Redmond, WA (US)

(72) Inventors: Bharat Srinivas Pillilli, El Dorado Hills, CA (US); Vishal Soni, Redmond, WA (US); Bryan David Kelly, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 208 days.

(21) Appl. No.: 18/090,666

(22) Filed: Dec. 29, 2022

(65) Prior Publication Data

US 2024/0220650 A1 Jul. 4, 2024

(51) Int. Cl.
| | |
|---|---|
| *G06F 21/62* | (2013.01) |
| *G06F 21/31* | (2013.01) |
| *G06F 21/32* | (2013.01) |
| *H04L 9/40* | (2022.01) |

(52) U.S. Cl.
CPC .......... *G06F 21/6245* (2013.01); *G06F 21/31* (2013.01); *G06F 21/32* (2013.01); *G06F 21/6218* (2013.01); *H04L 63/0428* (2013.01)

(58) Field of Classification Search
CPC ...... G06F 21/32; G06F 21/31; G06F 21/6254; G06F 21/6218; G06F 21/602; G06F 21/6245; H04L 63/102; H04L 63/0428; G06N 20/00; G16H 10/60
See application file for complete search history.

(56) References Cited

U.S. PATENT DOCUMENTS

| | | | | |
|---|---|---|---|---|
| 11,422,944 | B2* | 8/2022 | Guo | H04L 61/2596 |
| 2002/0049840 | A1* | 4/2002 | Squire | H04L 61/25 |
| | | | | 709/225 |
| 2008/0219186 | A1* | 9/2008 | Bell | H04L 67/125 |
| | | | | 370/254 |
| 2009/0144508 | A1* | 6/2009 | Freimuth | G06F 12/1027 |
| | | | | 710/25 |
| 2014/0354667 | A1* | 12/2014 | Lin | G06F 9/45533 |
| | | | | 345/568 |
| 2017/0054639 | A1* | 2/2017 | Zhou | H04W 92/02 |

(Continued)

OTHER PUBLICATIONS

International Search Report and Written Opinion received for PCT Application No. PCT/US2023/036217, Feb. 2, 2024, 20 pages.

*Primary Examiner* — Ninos Donabed
(74) *Attorney, Agent, or Firm* — Workman Nydegger

(57) ABSTRACT

Techniques for ensuring address translation services (ATS) functionality is used correctly and safely for any type of device that supports ATS, even for devices that might potentially be acting in a rogue manner, are disclosed. A host performs an integrity check on a device that uses ATS to prevent the device from maliciously using a locally cached HPA. The device submits a first ATS-enabled request to the host. The device receives metadata comprising (i) a first integrity check vector (ICV) that is usable to authenticate the device, (ii) the HPA, and (iii) an initialization vector (IV). The device locally caches the metadata in an address translation cache (ATC). The device submits a second ATS-enabled request, which includes the metadata. The host then independently authenticates the device using the received metadata in the request.

20 Claims, 8 Drawing Sheets

(56) References Cited

U.S. PATENT DOCUMENTS

| | | | |
|---|---|---|---|
| 2017/0060911 A1* | 3/2017 | Loscalzo | G06F 16/258 |
| 2017/0177495 A1* | 6/2017 | Franko | G06F 12/10 |
| 2019/0228145 A1* | 7/2019 | Shanbhogue | G06F 13/1668 |
| 2019/0297015 A1* | 9/2019 | Marolia | G06F 12/1081 |
| 2020/0026661 A1* | 1/2020 | Kounavis | G06F 12/0835 |
| 2020/0371953 A1* | 11/2020 | Guo | G06F 12/1081 |
| 2021/0034788 A1* | 2/2021 | Savagaonkar | G06F 21/602 |
| 2021/0263779 A1* | 8/2021 | Haghighat | G06F 9/5061 |
| 2021/0349841 A1* | 11/2021 | Makhervaks | G06F 3/0607 |
| 2021/0374087 A1* | 12/2021 | Koufaty | G06F 13/404 |
| 2021/0406199 A1* | 12/2021 | Kounavis | G06F 12/063 |
| 2022/0114107 A1* | 4/2022 | Duda | G06F 13/4295 |
| 2022/0159059 A1* | 5/2022 | Abhigyan | H04L 67/51 |
| 2022/0197506 A1* | 6/2022 | Blagodurov | G06F 12/0246 |
| 2023/0214329 A1* | 7/2023 | Woo | G06F 12/0868 711/154 |
| 2023/0229609 A1* | 7/2023 | Gotsis | G06F 9/45558 710/22 |

\* cited by examiner

SECURING ATS FROM ROGUE DEVICES FOR CONFIDENTIAL COMPUTING

BACKGROUND

Address Translation Service (ATS) refers to a set of configurations and protocols that provide address translations to a device, such as a PCIe device. ATS provides the ability for a PCIe device (aka endpoint) to communicate with a root complex so that the PCIe device can maintain a translation cache, or an Address Translation Cache (ATC). By doing so, the PCIe device can assume some of the responsibilities that the root complex would ordinarily handle. Stated differently, ATS offloads some of the work performed by the root complex to the PCIe device. Address translation tasks are often quite time consuming. By enabling the PCIe device to perform the address translation, the root complex can operate more efficiently.

Many computing systems now utilize virtualization technology, such as virtual machines (VM). Indeed, a VM can run on a PCIe device. A hypervisor is capable of virtualizing actual physical memory so that an operating system running in a VM can use its own contiguous physical memory. To facilitate these operations, the hypervisor can be used to translate or map a so-called "Guest-Physical Address" (GPA) into a "Host-Physical Address" (HPA), which refers to the native physical address space.

Because ATS enables a PCIe device running a VM to directly use HPAs, ATS thus eliminates the overhead that occurs when mapping GPAs to HPAs. To eliminate this overhead, ATS enables an ATC to be provisioned inside of the PCIe device.

The ATC is populated by requesting the physical address from the host/translation agent (TA) (often the CPU). The PCIe device can then use this address to directly access the host's memory. The host can then skip the GPA-to-HPA translation when the ATS indication is set.

One issue with ATS capability is that a rogue PCIe device can issue the request to any memory address by enabling its ATS capability. The rogue PCIe device might then be able to look at any memory location. A skilled person can clearly appreciate how such a scenario can cause a security issue and can likely break the confidential computing promise.

Some techniques have been implemented in an attempt to avoid such a scenario. For instance, a technique called Integrity & Data Encryption (IDE) provides PCIe link protection. Another technique, called Trust Execution Environment (TEE) Device Interface Security Protocol (TDISP) provides protection to isolate data between independent virtual functions (VF) or virtual machines (VM). These security technologies, however, do not protect against a scenario where a rogue device is able to access memory unassigned to it when ATS is enabled.

To address these security loopholes, host devices can be configured to implement proprietary solutions. For instance, one example of a proprietary solution is to actually not provide HPA; rather, the solution is to provide an intermediate address for an ATS request, and the intermediate address is then verified against the cached values. The disadvantage of such a solution is that the underlying purpose of ATS (i.e. removing translations) is not achieved. What is needed, therefore, is an improved technique for providing ATS features while also ensuring that rogue PCIe devices cannot maliciously use cached addresses.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are directed to systems, devices, and methods that ensure address translation services (ATS) functionality is being used correctly and safely for any type of device that supports ATS, even for devices that might potentially be acting in a rogue manner.

Some embodiments are structured to perform an integrity check on a device that is configured to use ATS to prevent the device from maliciously using a locally cached HPA. For example, the device can submit a first ATS-enabled request to an ATS host, where the first ATS-enabled request is a request for the ATS host to translate a guest-physical address (GPA) to a host-physical address (HPA). The device can then receive, from the ATS host, metadata comprising (i) a first integrity check vector (ICV) that is usable to authenticate the device, (ii) the HPA, and (iii) an initialization vector (IV). The device then locally caches the metadata in an address translation cache (ATC). After the metadata has been cached, the device submits a second ATS-enabled request to the ATS host. The second ATS-enabled request comprises the metadata that was cached. Based on a result of an inline verification performed on the metadata, where the inline verification determines that the device is authenticated, the device obtains access to a memory controller to facilitate processing of the second ATS-enabled request. The device receives, from the ATS host, new metadata comprising (i) a new ICV that is usable to subsequently authenticate the device, (ii) the HPA, and (iii) an incremented version of the IV. The device then locally caches the new metadata in the ATC.

In some embodiments, the ATS host receives, from the device, a first ATS-enabled request, where the first ATS-enabled request is a request for the ATS host to translate a GPA to an HPA. The ATS host translates the GPA to the HPA. The ATS host also accesses a key that is unique to the device. The ATS host uses (i) the key, (ii) the HPA, and (iii) an initialization vector (IV) to generate a first integrity check vector (ICV), which is usable to authenticate the device. The ATS host sends, to the device, (i) the first ICV, (ii) the HPA, and (iii) the IV. Later, the ATS host receives, from the device, a second ATS-enabled request, where the second ATS-enabled request comprises (i) the first ICV, (ii) the HPA, and (iii) the IV. The ATS host performs an inline verification of the first ICV that was received in the second ATS-enabled request. This inline verification is performed by computing a second ICV using (i) the key, (ii) the HPA received in the second ATS-enabled request, and (iii) the IV received in the second ATS-enabled request. The inline verification is also performed by comparing the second ICV against the first ICV and then determining whether the second ICV matches the first ICV.

In some embodiments, a system comprises the ATS host and a PCIe device. The system causes the PCIe device to submit a first ATS-enabled request to the ATS host, where the first ATS-enabled request is a request for the ATS host to translate a GPA to an HPA for the PCIe device. The system causes the ATS host to translate the GPA to the HPA. The system also causes the ATS host to access a key that is unique to the PCIe device. Optionally, the key can be locally stored on the ATS host. The system causes the ATS host to use (i) the key, (ii) the HPA, and (iii) an initialization vector to generate a first integrity check vector (ICV). Optionally, the initialization vector is locally stored on the ATS host. The system causes the ATS host to send (i) the first ICV, (ii) the HPA, and (iii) the initialization vector to the PCIe device. The system causes the PCIe device to locally cache (i) the first ICV, (ii) the HPA, and (iii) the initialization vector in an address translation cache (ATC) of the PCIe device. After (i) the first ICV, (ii) the HPA, and (iii) the initialization vector have been cached in the ATC of the PCIe device, the system causes the PCIe device to trigger a second ATS-enabled request to the ATS host, where the second ATS-enabled request comprises (i) the first ICV that was cached in the ATC, (ii) the HPA that was cached in the ATC, and (iii) the initialization vector that was cached in the ATC. The system causes the ATS host to perform an inline verification of the first ICV that was received in the second ATS-enabled request. The inline verification is performed by computing a second ICV using (i) the key that is locally stored in the ATS host, (ii) the HPA received in the second ATS-enabled request, and (iii) the initialization vector received in the second ATS-enabled request. The verification is further performed by comparing the second ICV against the first ICV and then determining that the second ICV matches the first ICV. As a result, the first ICV is considered to be verified by the ATS host. The system causes the ATS host to send the second ATS-enabled request to a memory controller for processing on behalf of the PCIe device. The system also causes the ATS host to increment the initialization vector and to locally store the incremented initialization vector. The system causes the ATS host to compute a third ICV using (i) the key, (ii) the HPA received in the second ATS-enabled request, and (iii) the incremented initialization vector. The system causes the ATS host to send (i) the third ICV, (ii) the HPA, and (iii) the incremented initialization vector to the PCIe device. The system causes the PCIe device to locally cache (i) the third ICV, (ii) the HPA, and (iii) the incremented initialization vector in the ATC of the PCIe device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
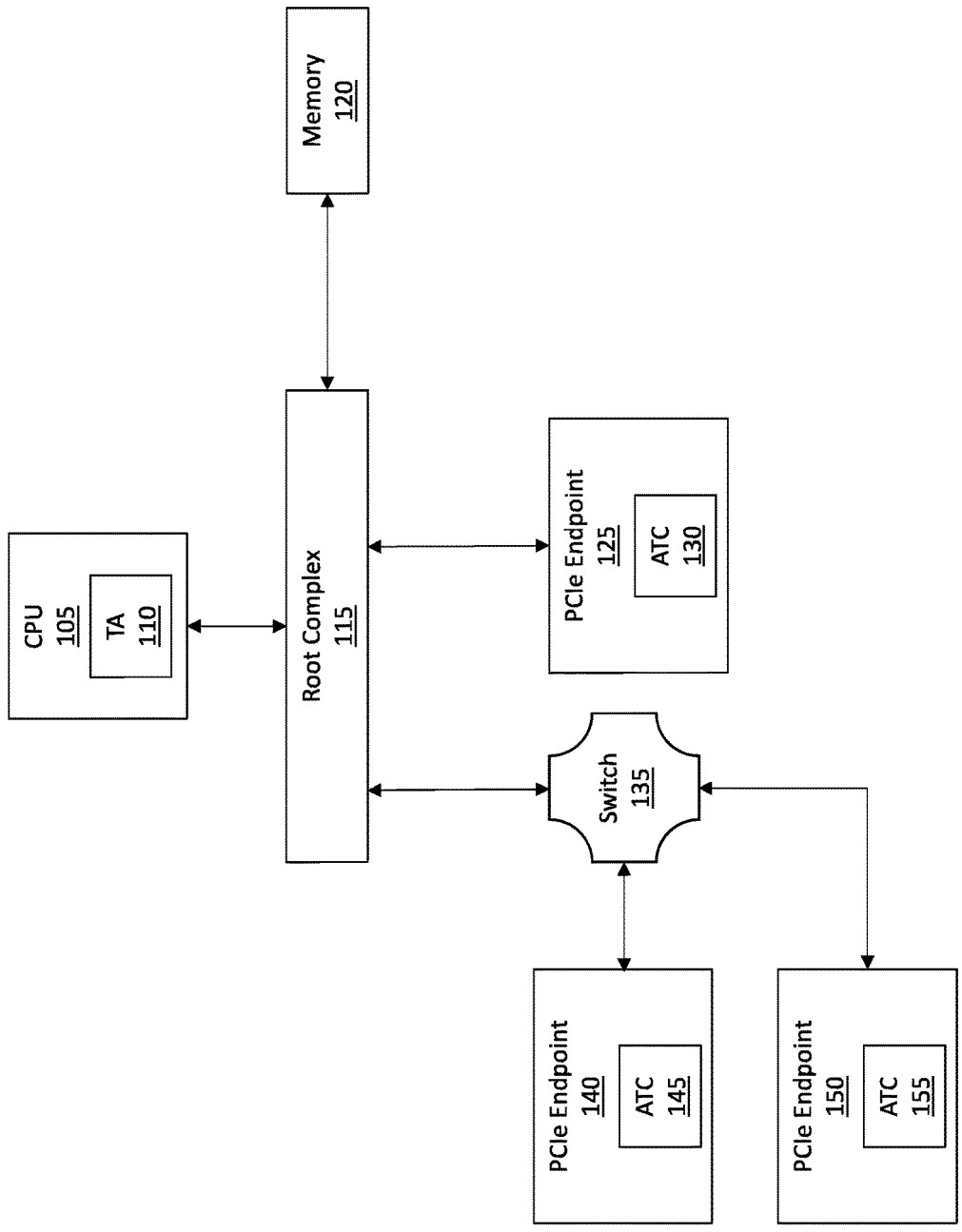
FIG. 1 illustrates an example architecture that implements ATS.

The disclosed embodiments are directed to systems, devices, and methods that ensure address translation services (ATS) functionality is used correctly and safely for any type of device that supports ATS, even for devices that might potentially be acting in a rogue manner.

Some embodiments perform an integrity check on a device that uses ATS to prevent the device from maliciously using a locally cached host-physical address (HPA). For example, the device submits a first ATS-enabled request to an ATS host, where the first ATS-enabled request is a request to translate a guest-physical address (GPA) to an HPA. The device receives metadata comprising (i) a first integrity check vector (ICV) that is usable to authenticate the device, (ii) the HPA, and (iii) an initialization vector (IV). The device locally caches the metadata in an address translation cache (ATC). Later, the device submits a second ATS-enabled request, which includes the cached metadata. The device obtains access to a memory controller to facilitate processing of the second ATS-enabled request. The device receives, from the ATS host, new metadata comprising (i) a new ICV that is usable to subsequently authenticate the device, (ii) the HPA, and (iii) an incremented version of the IV. The device then locally caches the new metadata in the ATC.

In some embodiments, the ATS host receives a first ATS-enabled request to translate a GPA to an HPA. The ATS host performs the translation. The ATS host accesses a key and then uses (i) the key, (ii) the HPA, and (iii) an initialization vector (IV) to generate a first integrity check vector (ICV), which is usable to authenticate the device. The ATS host sends, to the device, (i) the first ICV, (ii) the HPA, and (iii) the IV. Later, the ATS host receives a second ATS-enabled request comprising (i) the first ICV, (ii) the HPA, and (iii) the IV. The ATS host performs an inline verification of the first ICV that was received in the second ATS-enabled request.

In some embodiments, a system comprises the ATS host and a PCIe device. The system then facilitates the above operations using the ATS host and the PCIe device.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous benefits, advantages, and practical applications to the technical field of computer security. In particular, the embodiments are directed to techniques that provide improved authentication mechanisms to ensure that a device cannot access resources that it otherwise should not be able to access.

Address Translation Services (ATS) enables the use of Host-Physical Addresses (HPAs) directly by a device (e.g., PCIe device), thereby eliminating Guest-Physical Address (GPA) to Host Physical Address (HPA) overhead in the ATS host using an Address Translation Cache (ATC) inside the device. This ATC is populated by requesting the physical address from the host, and the device can use this address to directly access the host's memory, thereby allowing the host to skip the GPA to HPA translation when an ATS indication is set. One significant issue with this capability is that a rogue PCIe device can issue the request to "any" memory address by enabling ATS capability. The rogue device can then look at any memory location. Such a scenario causes a security issue which in turn breaks the confidential computing promise.

The disclosed solutions address these issues using a cryptographic integrity check technique. The integrity check is performed on the translated address, a key that can be refreshed periodically, and an initialization vector. The resulting integrity check vector is then provided to the PCIe device. During subsequent requests, the PCIe device can submit its integrity check vector, and the host can independently validate that vector. By performing the disclosed operations, the embodiments provide a solution that significantly reduces the integrity check drag on memory operations. Accordingly, these and numerous other benefits will now be discussed in more detail throughout the remaining sections of this disclosure.

PCIe Example Architecture

Attention will now be directed to FIG. 1, which illustrates an example architecture 100 that can be used to achieve the benefits listed above. Architecture 100 is shown as including a central processing unit (CPU) 105. The CPU 105 is the electronic circuit that executes instructions to perform various actions. The CPU 105 can be implemented as a system on a chip (SOC) or as any other circuit design.

In some cases, the CPU 105 can be or can include a translation agent (TA) 110. TA 110 is a type of logical or computing entity that is configured to convert an address from one address space to another address space. TA 110 is typically associated with memory, and the memory often includes various different translation or paging tables that TA 110 will use during the address translation processes. In some cases, TA 110 can also include an address translation cache used to cache the different address translations.

Architecture 100 is also shown as including a root complex 115 coupled to memory 120. The memory 120 can include the translation tables mentioned above. In a peripheral component interconnect express (PCIe) unit, the root complex 115 refers to a device that connects the CPU 105 and the memory 120 to the PCIe switch fabric, which can optionally include various different PCIe devices. For instance, architecture 100 is shown as including a first PCIe endpoint 125, which includes an ATC 130. Architecture 100 also shows a switch 135 that connects the root complex 115 to various other PCIe endpoints, such as PCIe endpoint 140, which includes an ATC 145, and PCIe endpoint 150, which includes ATC 155. The switch 135, and PCIe endpoints 125, 140, and 150 are a part of the PCIe switch fabric. The root complex 115 is structured to generate various transaction requests for the CPU 105. Root complex 115 can include multiple PCIe ports, thereby enabling multiple PCIe devices to be connected to the root complex 115. The switch 135 enables multiple PCIe devices to be connected to a single port of the root complex 115.

Initially Caching Addresses at the PCIe Device

Figure 2:
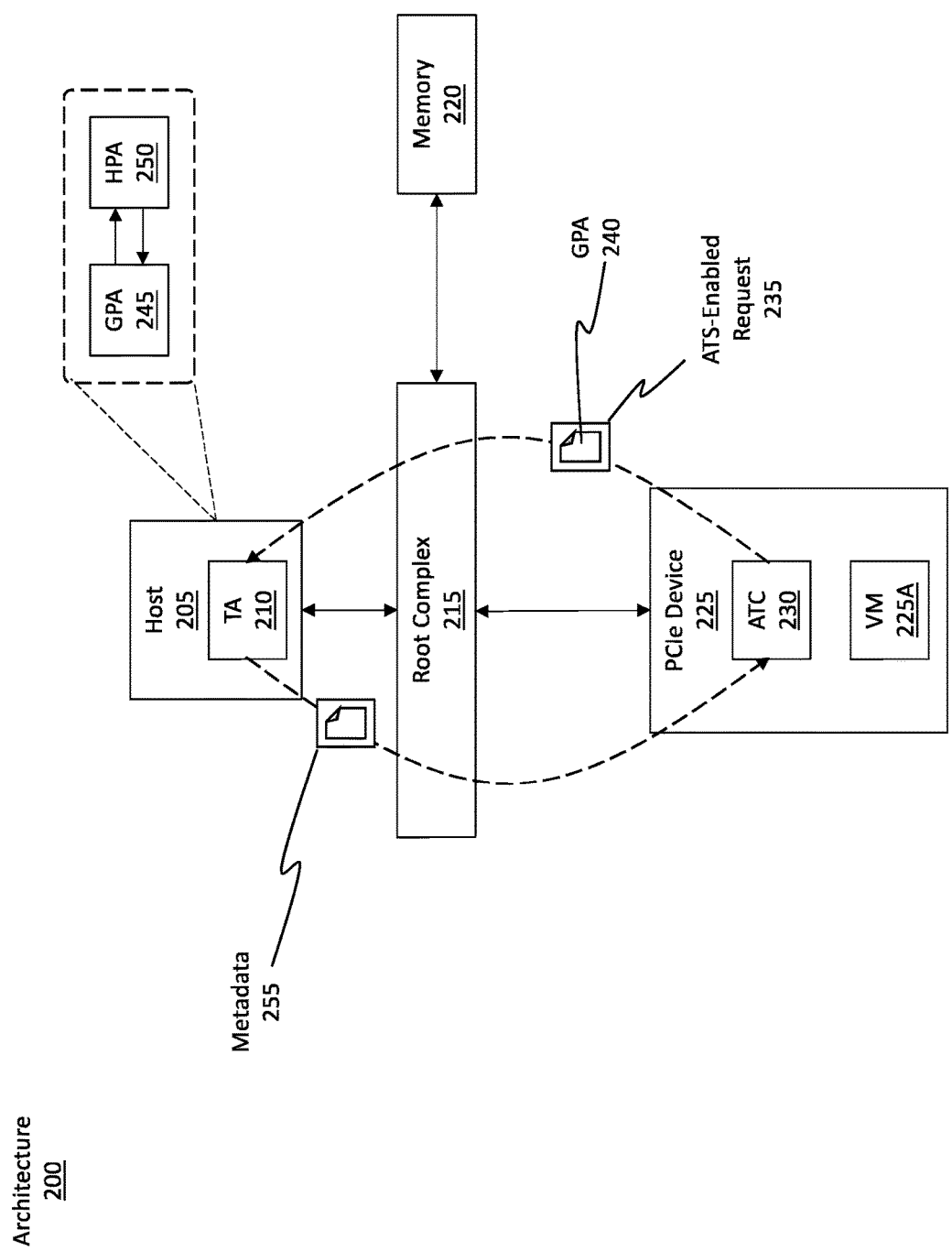
FIG. 2 illustrates an example architecture that provides cryptographic authentication information to an ATS-enabled device so the device can later be authenticated.

FIG. 2 shows an architecture 200 that is representative of the architecture 100 of FIG. 1. Architecture 200 is shown as including a host 205, which is representative of the CPU 105, and a TA 210. Architecture 200 further includes a root complex 215, memory 220, a PCIe device 225, a VM 225A operating on the PCIe device 225, and an ATC 230 in the PCIe device 225.

In accordance with the disclosed principles, the PCIe device 225 is initially populated with various addresses (using ATS functionality) that are used to access the dynamic random access memory (DRAM) and perhaps other memory or memory services of the host 205. As indicated above, PCIe device 225 is set up to include ATS functionality. During configuration or initial installation of the PCIe device into the architecture, the PCIe device can initially be validated and authenticated to use ATS. As will be discussed in more detail later, however, it might be the case that the PCIe device later becomes a rogue device and attempts to use its ATS functionality in an improper way. The embodiments are designed to prevent the PCIe device from improperly using its ATS functionality.

To obtain those addresses, PCIe device 225 submits an ATS-enabled request 235 to the host 205, or perhaps to the TA 210. This first ATS-enabled request 235 includes a guest-physical address (GPA) 240. A GPA refers to an address that is used by a virtual machine (e.g., VM 225A) to access the actual physical memory resources of memory hardware (e.g., memory 220). To enable a VM workload (e.g., an ATS-enabled read or write request) to access certain data in memory, the underlying architecture will be tasked with looking up the physical memory address (i.e. the host-physical address, HPA) that corresponds to or that matches the virtual address (i.e. the GPA). This lookup operation is referred to as a memory translation or a memory mapping. Page or translation tables are typically used to map the GPA to the HPA.

After receiving the ATS-enabled request 235, the host 205 is tasked with performing the memory translation. For instance, FIG. 2 shows a GPA 245, which is representative of the GPS 240, and a HPA 250. The host 205 accesses various page or translation tables to map the GPA 245 to the HPA 250.

After successfully performing this memory translation operation, host 205 then returns metadata 255 to the PCIe device 225. In accordance with the disclosed principles, the metadata 255 is configured to include various units of data. Further details on this metadata 255 are shown in FIG. 3.

Figure 3:
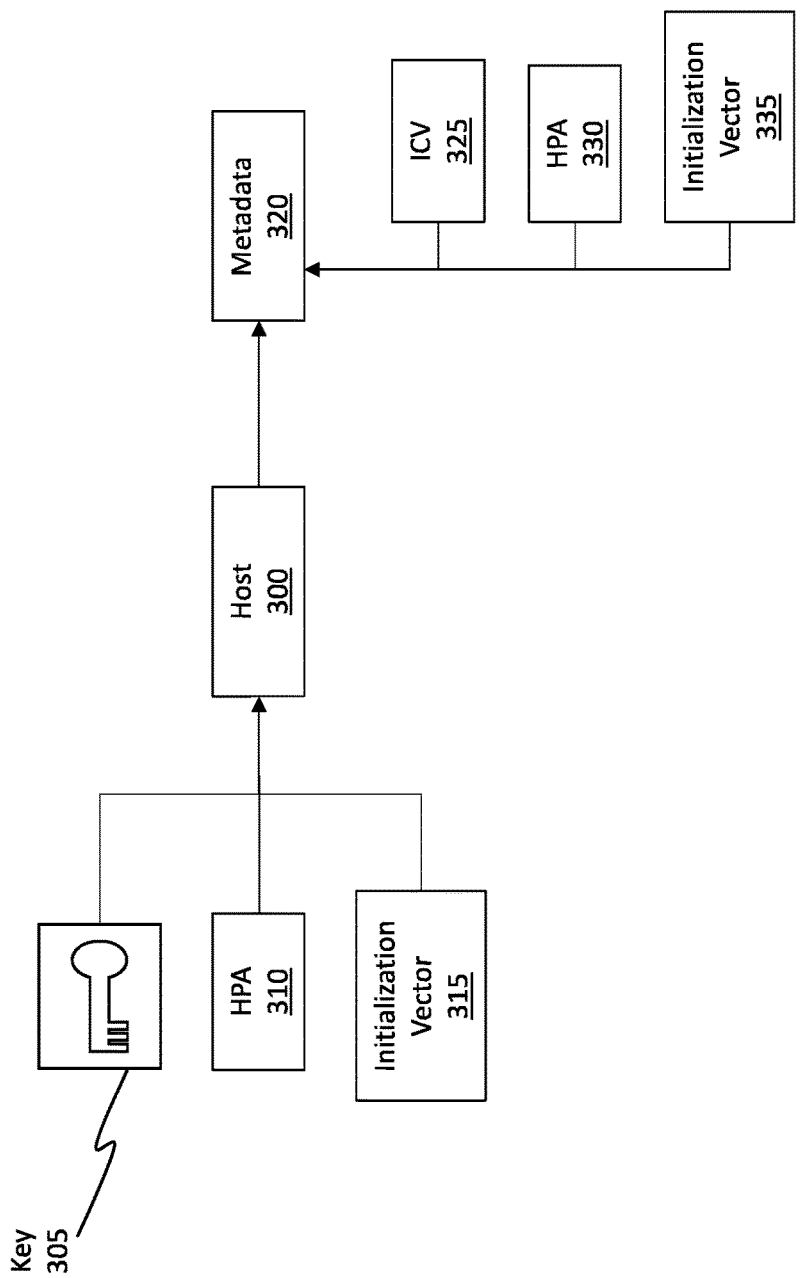
FIG. 3 illustrates how the cryptographic authentication information (e.g., an integrity check vector) can be generated.

FIG. 3 shows a host 300, which is representative of the host 205 from FIG. 2. The host 300 generates or perhaps accesses a key 305 that is unique to whatever PCIe device the host 300 is communicating with. For instance, in this example, key 305 is unique to PCIe device 225 of FIG. 2. By "unique" it is meant that the key 305 is specifically tailored for use only for operations involving the PCIe device 225; no other PCIe device can use the key 305 or have operations performed using key 305.

In some implementations, the PCIe device is a single virtual function device. In such a scenario, a single key is then generated for the PCIe device. In other implementations, the PCIe device includes multiple virtual functions. In this scenario, a different key can be generated for each of the different virtual functions of the PCIe device. Thus, it may be the case that a single PCIe device can be associated with multiple keys, such as one key for each virtual function of the PCIe device.

FIG. 3 also shows the translated HPA 310, which is representative of the HPA 250 from FIG. 2. To be clear, the host has translated a GPA to the HPA 310.

FIG. 3 also shows an initialization vector (IV) 315. The IV 315 refers to a variable that can be incremented and that can be provided as input to help obfuscate or obscure other data so that the other data cannot be inferred or discerned by other entities. That is, the IV 315 can be used in combination with the key 305 to perform various different cryptographic operations. These cryptographic operations, as will be discussed in more detail later, are performed in order to validate or authenticate the PCIe device to ensure the PCIe device is not operating in a rogue manner, particularly with regard to use of its ATS functionalities.

The host 300 uses the key 305, the HPA 310, and the IV 315 to generate the metadata 320, which is representative of the metadata 255 from FIG. 2 and which is a form of cryptographic data. For instance, the host 300 can utilize a hash based message authentication code (HMAC) to generate a so-called "integrity check vector" (ICV), which can be included in the metadata 255. More particularly, the host 300 can perform the following: ICV=HMAC (key, HPA, IV)

FIG. 3 shows how the metadata 320 includes the ICV 325. The metadata 320 further includes the HPA 330, which is representative of the HPA 310, and the IV 335, which is representative of the IV 315.

Returning to FIG. 2, the host 205 transmits the metadata 255 to the PCIe device 225. Recall, the metadata 255 includes an ICV, an HPA, and an IV. The PCIe device 225 then locally caches the metadata 255 in the ATC 230. Consequently, the PCIe device 225 locally caches the ICV, the HPA, and the IV.

For subsequent ATS-enabled requests, the PCIe device can submit the ICV, the HPA, and the IV to the host. The host can then independently compute a new ICV using the locally stored (at the host 205) key for the PCIe device 225, the received HPA, and the received IV. After computing the new ICV, the host 205 can then compare the new ICV against the ICV received in the subsequent ATS-enabled request. If the two ICVs match, then the host 205 can be assured that the PCIe device 225 is operating correctly and is not operating in a rogue manner. The ATS-enabled request can then be processed. On the other hand, if the ICVs do not match, then the host 205 can determine either that the PCIe device 225 is operating in a rogue manner or is operating using false data. Consequently, the host 205 can terminate the request and potentially perform various corrective actions in an attempt to rectify the PCIe device's status.

Processing Subsequent ATS-Enabled Requests

Figure 4:
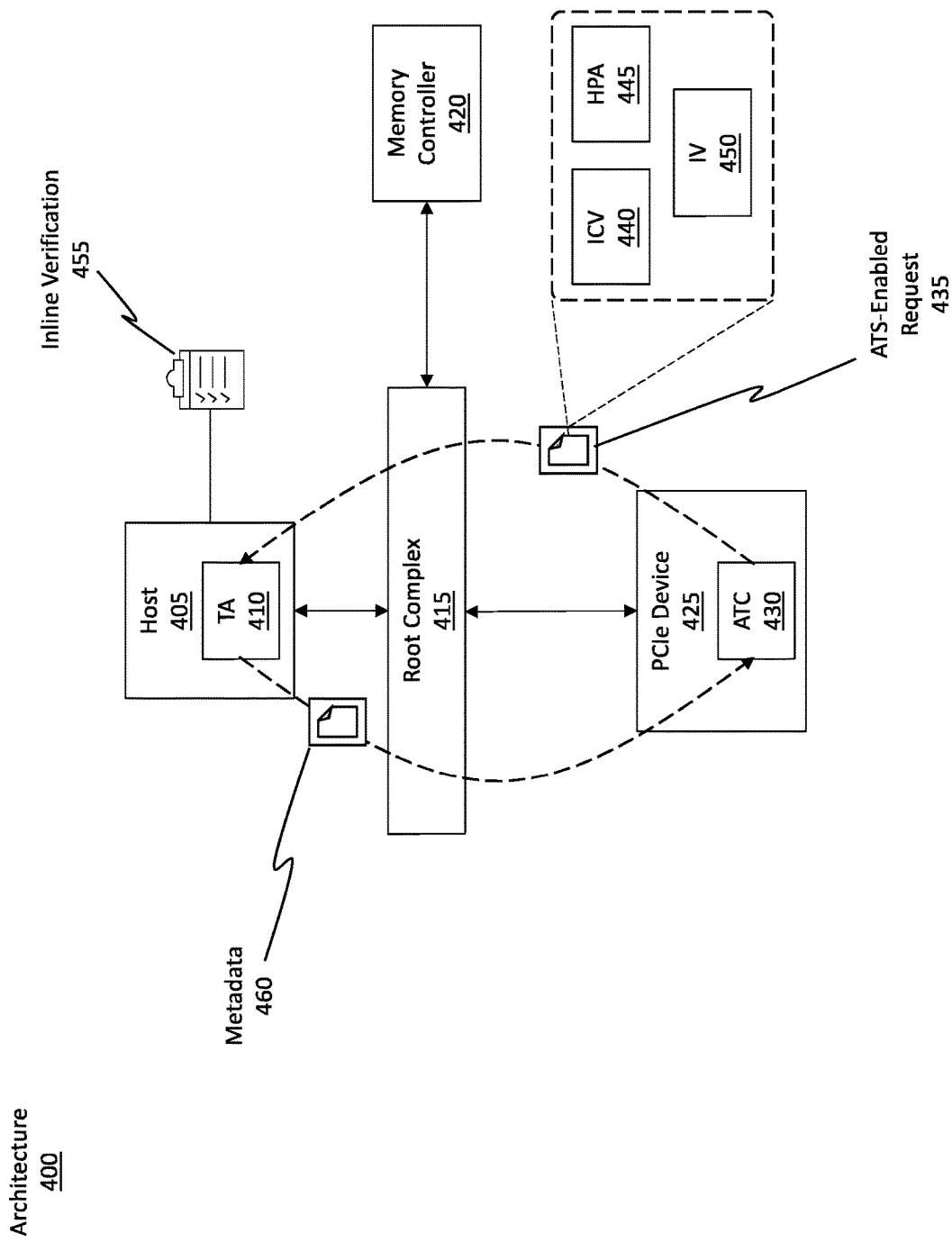
FIG. 4 illustrates an example scenario where the cryptographic authentication information is being used to validate a device.

FIG. 4 shows an example architecture 400 that is representative of the architectures discussed thus far. The scenario shown in FIG. 4 occurs after the PCIe device has been populated with a translated address. In particular, architecture 400 is shown as including a host 405, a TA 410, a root complex 415, a memory controller 420 (which accesses the memory 220), a PCIe device 425, and an ATC 430 in the PCIe device 425.

After the metadata 255 from FIG. 2 has been cached in the ATC 430, which is representative of the ATC 230 of FIG. 2, the PCIe device 425 may then generate a second or subsequent ATS-enabled request 435. This ATS-enabled request 435 may be a memory read or write request using the ATS functionality. For instance, the ATS-enabled request 435 may be a request to access DRAM of the host 405.

In accordance with the disclosed principles, the ATS-enabled request 435 is structured to include its read or write request as well as the ICV 440, the HPA 445, and the IV 450. The ICV 440, the HPA 445, and the IV 450 were all previously cached in the ATC 430.

The PCIe device 425 submits the ATS-enabled request 435 to the host 405. The host 405 then performs an inline verification 455 to ensure that the PCIe device 425 is not operating in a rogue manner.

The inline verification 455 includes a number of operations. One operation involves accessing the key that is unique to the PCIe device 425. The host 405 then uses the key, the HPA 445 that was included in the ATS-enabled request 435, and the IV 450 that was also included in the ATS-enabled request 435 to then generate a second ICV using the HMAC process discussed earlier. The host 405 then compares the ICV 440 that was included in the ATS-enabled request 435 against this newly generated ICV to determine whether they match. If the two ICVs match, then the host 405 can determine with certainty that the PCIe device 425 is not operating in a rogue manner. If the two ICVs do not match, then the host 405 can terminate or kill the ATS-enabled request 435.

If the inline verification 455 finds that the PCIe device 425 is authenticated, then the ATS-enabled request 435 can be processed by the memory controller 420. Furthermore, the host 405 can prepare updated metadata 460 and send that updated metadata 460 to the PCIe device 425.

The updated metadata 460 includes a newly computed ICV (a third ICV). This third ICV is computed using the key that is unique to the PCIe device 425. The third ICV is further computed using the HPA 445. Even further, this third ICV is computed using an incremented version of the IV, which is stored locally on the host 405.

The IV is provided to not only improve the cryptographic aspects of the ICV, but it is also provided to prevent PCIe devices from repeatedly submitting the same request over and over or repeatedly attempting to use a cached HPA. In other words, it prevents PCIe devices from performing replay attacks. Incrementing the IV helps to defeat the ability for rogue actors to attempt to compute the key that is used to compute the ICV.

For every new ATS-enabled request, the host increments the IV. In some implementations, the IV can be a 256 bit value or number. When a sufficient number of ATS-enabled requests are transmitted, the IV might rollover due to its limited size and bit number. When an IV rollover event occurs, the host can be triggered to generate a new key for the PCIe device (or the virtual function of the PCIe device).

In some cases, the generation of the new key can be triggered earlier than when the bits of the IV rollover. For instance, a hysteresis point can be defined for the IV. When the hysteresis point is hit based on the increments of the IV, then the host can be triggered to generate the new key. The hysteresis point can be set to any value. For instance, the hysteresis point can be set to a 50% mark for the bits of the IV. In some cases, the hysteresis point can be the 75% mark. Any hysteresis point can be set. Typical points are between the range of 25%-90% of the bits, as incremented. For instance, if the IV is a 3 bit vector, the IV can have the following values: 0, 1, 2, 3, 4, 5, 6, 7, and 8. In one example, the hysteresis point might be set to the value 4. After the IV reaches the value 4, the IV will be caused to rollover, and a new key will be generated.

When a new key is generated for the PCIe device, the host also triggers the PCIe device to flush its ATC. Because a new key is being used, the ICV that was stored in the PCIe device's ATC will now no longer be valid.

As indicated earlier, if the inline verification 455 is successful, the metadata 460 is sent to the PCIe device 425. The metadata 460 includes the third ICV, the HPA, and the incremented IV. If the inline verification 455 is successful, the ATS-enabled request 435 is also processed by the memory controller 420.

In some cases, the ATS-enabled request 435 is processed in a speculative manner. For instance, suppose the ATS-enabled request 435 is a memory read request. The host 405 can cause the memory controller 420 to begin processing the memory read request in parallel with the inline verification 455. If the memory read request finishes prior in time to the inline verification 455, the host 405 can hold on to the read data that was read from memory until the inline verification 455 is complete. If the inline verification 455 shows that the PCIe device 425 is authentic, then the read data can be transmitted back to the PCIe device 425. On the other hand, if the inline verification 455 shows that the PCIe device 425 is not authentic, then the host can prevent that data that was read from being delivered to the PCIe device 425.

Write requests can also optionally be performed speculatively, or at least in part speculatively, similar to the read requests. For instance, any data preparation or computation that needs to occur prior in time to the actual write operation can be performed speculatively. If the PCIe device is determined to be authentic, then the write operation can commence; otherwise, the write operation will not be performed.

Accordingly, in some embodiments, the ATS-enabled request 435 is a read request. In such a scenario, the host 405 can send the read request to the memory controller 420 in parallel with performance of the inline verification 455. In response to determining that the second ICV does not match the first ICV (ICV 440) as a part of the inline verification 455, the host 405 can prevent data that was read as a part of the read request from being delivered to the PCIe device 425.

In some implementations, the ATS-enabled request 435 is a read request. In such a scenario, the host 405 can issue the read request during an overlapping time period with when the inline verification 455 is performed. Upon determining that the inline verification 455 failed, the host 405 can set an invalid bit into a request completion queue associated with the ATS-enabled request 435. Furthermore, in response to obtaining data that is read as a part of the read request, the embodiments (e.g., perhaps the host 405 or perhaps the memory controller 420) can (i) squash (i.e. delete, obfuscate, or otherwise render unusable) the data, (ii) cause the read request to be labeled as an undefined request, and (iii) generate an interrupt for the host 405 to be informed about an attempted unauthorized access by the PCIe device 425.

In some implementations, the ATS-enabled request 435 is performed speculatively. As a request, the ATS-enabled request 435 can be performed at least partially before completion of the inline verification 455.

In some embodiments, the ATS-enabled request 435 is a write request. Optionally, the write request can at least partially be performed in parallel with the inline verification 455.

Example Process Flow

Figure 5:
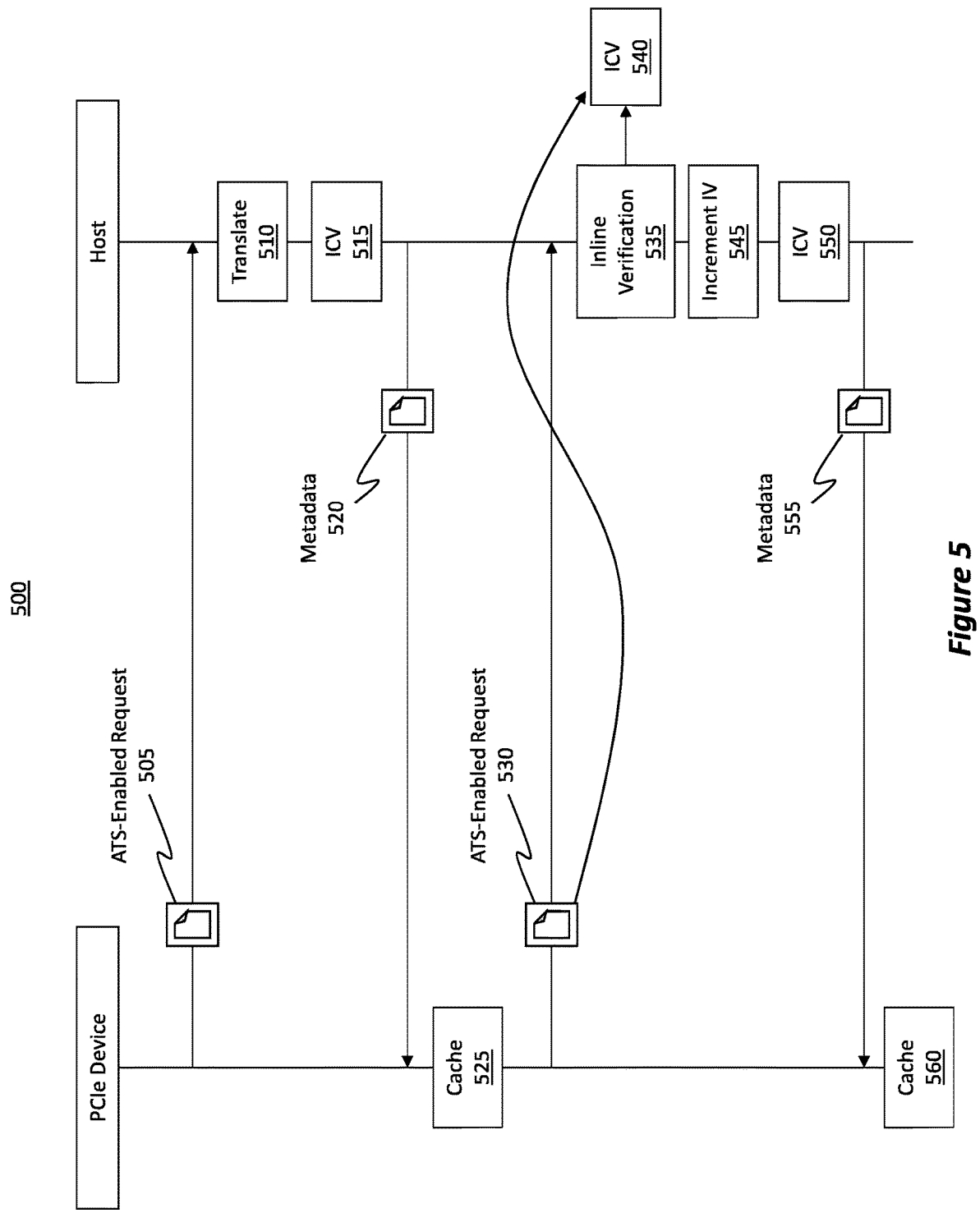
FIG. 5 illustrates an example process flow outlining some of the activities performed by a PCIe device and an ATS host.

Attention will now be directed to FIG. 5, which illustrates an example process flow 500 illustrating the various operations that are performed by the PCIe device (e.g., PCIe endpoints/devices 125, 225, and 425 of FIGS. 1, 2, and 4, respectively) and the host (e.g., CPU 105 of FIG. 1, host 205 of FIG. 2, host 300 of FIG. 3, and host 405 of FIG. 4). The process flow 500 can be performed in architectures 100, 200, and 400.

Process flow 500 generally outlines techniques for performing an integrity check on a peripheral component interconnect express (PCIe) device that is configured to use an address translation service (ATS) to prevent the PCIe device from maliciously using a locally cached HPA.

Process flow 500 includes an act of causing the PCIe device to submit a first ATS-enabled request 505 to an ATS host. The first ATS-enabled request 505 comprises a GPA (e.g., GPA 240 of FIG. 2) for the PCIe device. The first ATS-enabled request 505 is a request for the ATS host to translate the GPA to an HPA (e.g., HPA 250 of FIG. 2) for the PCIe device.

The ATS host then translates (e.g., translate 510) the GPA to the HPA. The ATS host also accesses a key that is unique to the PCIe device. In some embodiments, the key is locally stored on the ATS host. In some cases, the key can be tailored for the PCIe device as whole. In other cases, the key can be unique to a particular virtual function of the PCIe device.

The ATS host uses (i) the key, (ii) the HPA, and (iii) an initialization vector (IV) to generate a first integrity check vector (ICV) 515. The IV is locally stored on the ATS host. In some implementations, the IV can be incremented. For instance, each time a new ATS-enabled request is received, the IV can be incremented. In some instances, the IV is incremented only in response to an ATS-request being processed successfully. In some cases, the IV is incremented for each ATS-request, regardless of whether it is processed successfully. The IV can be limited in size. When the maximum value of the IV is reached (due to the increments), the IV can be rolled over and start anew. In some cases, the rollover may be triggered in response to the IV hitting a value that is not a maximum value, such as a defined hysteresis point. Instead of rolling over when a maximum value is reached, the IV can be triggered to roll over when the hysteresis point is reached. Setting a hysteresis point can be beneficial to avoid scenarios where stale ICVs are attempted to be used. The rollover event, as discussed earlier, can also trigger the generation of a new key for the PCIe device and can further trigger the PCIe device to flush its ATC.

The ATS host then sends metadata 520 comprising (i) the first ICV, (ii) the HPA, and (iii) the IV to the PCIe device. The PCIe device locally caches (e.g., cache 525) (i) the first ICV, (ii) the HPA, and (iii) the IV in an address translation cache (ATC) of the PCIe device.

After (i) the first ICV, (ii) the HPA, and (iii) the initialization vector have been cached in the ATC of the PCIe device, the PCIe device might trigger a second ATS-enabled request 530 to the ATS host. The second ATS-enabled request 530 comprises (i) the first ICV that was cached in the ATC, (ii) the HPA that was cached in the ATC, and (iii) the initialization vector that was cached in the ATC.

The ATS host performs an inline verification 535 of the first ICV that was received in the second ATS-enabled request. This inline verification is performed by computing a second ICV 540 using (i) the key that is locally stored in the ATS host, (ii) the HPA received in the second ATS-enabled request, and (iii) the initialization vector received in the second ATS-enabled request. FIG. 5 shows how the data in the ATS-enabled request 530 is used to compute the second ICV 540.

As a part of the inline verification, the ATS host then compares the second ICV against the first ICV. In some cases, the ATS host might determine that the second ICV matches the first ICV. As a result, the first ICV is considered to be verified by the ATS host, and the ATS host considers the PCIe device to be authentic.

The ATS-enabled request 530 can be processed (sometimes in parallel with the inline verification 535). Stated differently, the ATS host can send the second ATS-enabled request 530 to a memory controller for processing on behalf of the PCIe device.

In some cases, the two ICVs might not match. In such a scenario, the ATS host will terminate the ATS-enabled request 530.

In one embodiment, the ATS host increments the initialization vector (e.g., increment IV 545) and locally stores the incremented initialization vector. Optionally, the increment can occur only when the two ICVs match. In another embodiment, the increment can occur each time an ATS-enabled request is received, regardless of whether the ICVs match.

The ATS host computes a third ICV 550 using (i) the key, (ii) the HPA received in the second ATS-enabled request, and (iii) the incremented initialization vector. The ATS host then sends metadata 555 comprising (i) the third ICV, (ii) the HPA, and (iii) the incremented initialization vector to the PCIe device. The PCIe device locally caches (e.g., cache 560) (i) the third ICV, (ii) the HPA, and (iii) the incremented initialization vector in the ATC of the PCIe device.

Example Method—Perspective of the PCIe Device

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
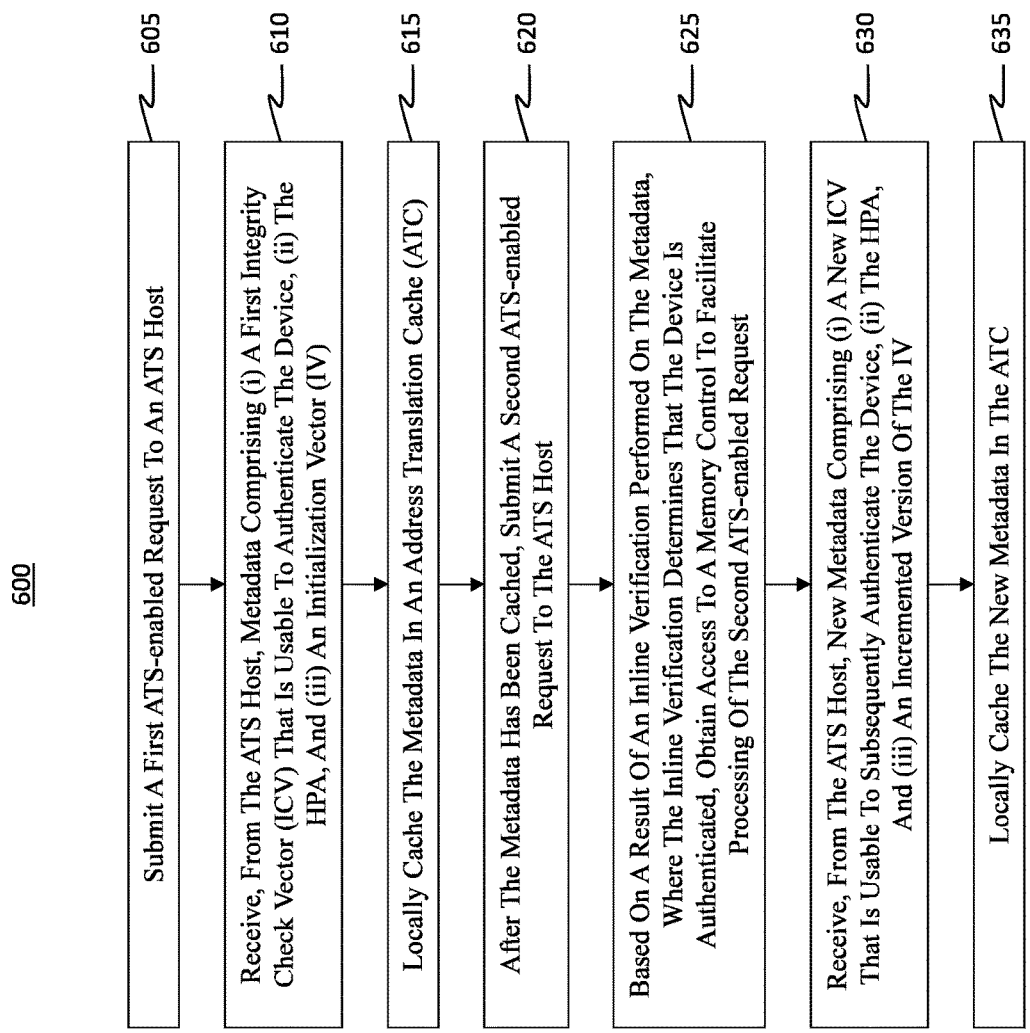
FIG. 6 illustrates a flowchart of an example method performed by a PCIe device.

Attention will now be directed to FIG. 6, which illustrates a flowchart of an example method 600 for performing an integrity check on a device that is configured to use an address translation service (ATS) to prevent the device from maliciously using a locally cached HPA. Method 600 can be performed by the PCIe device 425 of FIG. 4. Stated differently, the device can be a PCIe device. In some implementations, the PCIe device is a single virtual function device while in other implementations, the PCIe device is a multiple virtual function device.

Method 600 includes an act (act 605) of submitting a first ATS-enabled request (e.g., ATS-enabled request 235 of FIG. 2) to an ATS host (e.g., host 205). The first ATS-enabled request is a request for the ATS host to translate a GPA (e.g., GPA 240, 245) to an HPA (e.g., HPA 250). In some implementations, the device is running at least one virtual machine (VM). In such a scenario, the GPA can optionally be for that VM.

Act 610 includes receiving, from the ATS host, metadata (e.g., metadata 255 from FIG. 2 or metadata 320 from FIG. 3). This metadata includes (i) a first integrity check vector (ICV) (e.g., ICV 325) that is usable to authenticate the device, (ii) the HPA (e.g., HPA 330), and (iii) an initialization vector (IV) (e.g., IV 335).

Act 615 includes locally caching the metadata in an address translation cache (ATC) (e.g., ATC 230). Consequently, not only is the HPA cached locally at the PCIe device but the ICV and the IV are also cached locally in the PCIe device. Furthermore, these data units are cached in the PCIe device's ATC.

After the metadata has been cached, act 620 includes submitting a second ATS-enabled request (e.g., ATS-enabled request 435 of FIG. 4) to the ATS host. The second ATS-enabled request comprises the metadata that was cached. In some implementations, the second ATS-enabled request is a read request for the memory controller. Optionally, the second ATS-enabled request can be a request to access dynamic random access memory (DRAM) of the ATS host (e.g., the CPU). In other implementations, the second ATS-enabled request is a write request for the memory controller.

Based on a result of an inline verification (e.g., inline verification 455) performed on the metadata, where the inline verification determines that the device is authenticated, there is an act (act 625) of obtaining access to a memory controller (e.g., memory controller 420) to facilitate processing of the second ATS-enabled request. Optionally, the ATS-enabled request can be performed speculatively, such as in a scenario where at least a portion of the ATS-enabled request is processed simultaneously with the performance of the inline verification.

Act 630 then includes receiving, from the ATS host, new metadata (e.g., metadata 460). This new metadata includes (i) a new ICV that is usable to subsequently authenticate the device, (ii) the HPA, and (iii) an incremented version of the IV. Optionally, the old ICV can be marked or otherwise indicated as no longer being valid. The results of performing the second ATS-enabled request can also be delivered to the device.

Act 635 includes locally caching the new metadata in the ATC. In some implementations, the new ICV and the incremented version of the IV replace the prior ICV and IV that were cached in the ATC. Thus, in some cases, old or stale versions of the ICV and IV are not maintained in the ATC.

In some cases, old versions of the ICV and IV can optionally be stored in the ATC for a limited period of time. As one example, a queue or buffer can optionally be provided or implemented in the ATC, and a running log of past ICVs and past IVs can be maintained. Old ICVs and old IVs can optionally be expelled from the queue when the queue is full and a new ICV and new IV is loaded into the queue.

In some cases, method 600 can further include an act where the device flushes its ATC in response to a triggering event occurring. For instance, the triggering event can be the generation of a new key for the device. This new key might be generated when the IV rolls over or when the IV hits a predefined hysteresis point. In some implementations, the triggering event can be an event where the host determines that all of its connected PCIe devices should be reauthenticated.

Example Method—Perspective of the ATS Host

Figure 7:
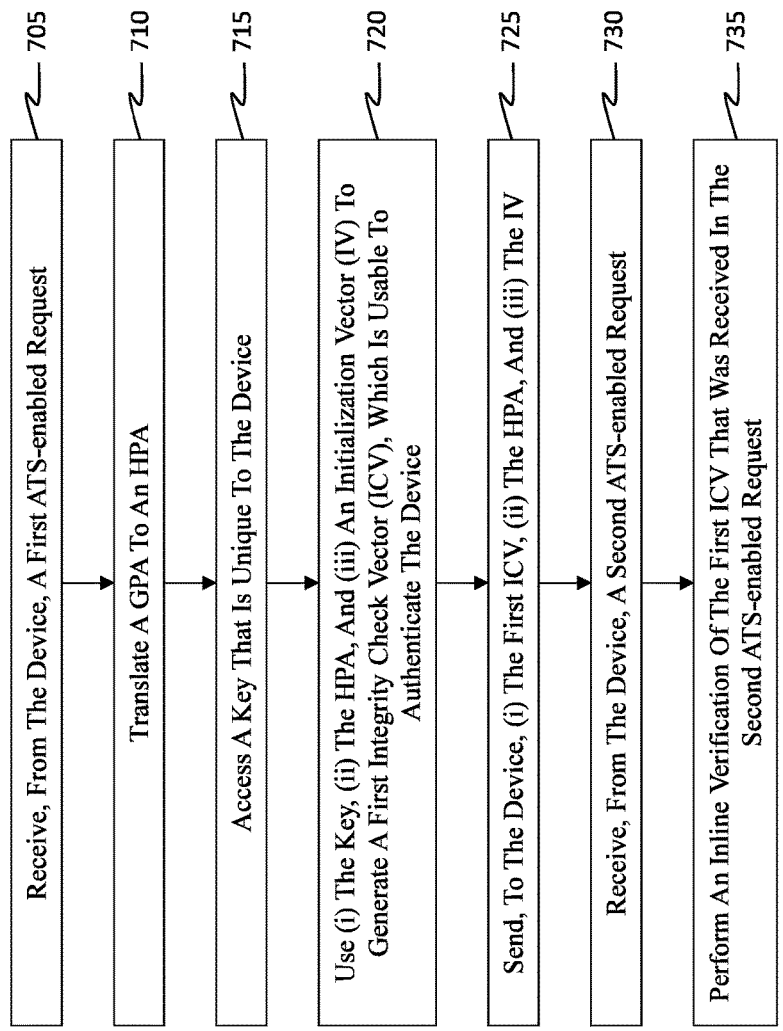
FIG. 7 illustrates a flowchart of an example method performed by an ATS host.

FIG. 7 shows a flowchart of an example method 700 from the perspective of the ATS host. For instance, method 700 can be implemented by the CPU 105 of FIG. 1, the host 205 of FIG. 2, the host 300 of FIG. 3, and/or the host 405 of FIG. 4.

Method 700 includes an act (act 705) of receiving, from the device (e.g., PCIe device 225), a first ATS-enabled request (e.g., ATS-enabled request 235). The first ATS-enabled request is a request for the ATS host to translate a GPA (e.g., GPA 240, 245) to an HPA (e.g., HPA 250).

Act 710 includes translating the GPA to the HPA. The translation can occur using various page or translation tables, as discussed previously.

Act 715 includes accessing a key (e.g., key 305) that is unique to the device. Optionally, the key can be stored locally at the ATS host.

Act 720 includes using (i) the key (e.g., key 305), (ii) the HPA (e.g., HPA 310), and (iii) an initialization vector (IV) (IV 315) to generate a first integrity check vector (ICV) (ICV 325). This first ICV is usable to authenticate the device. Optionally, the IV can be stored locally at the ATS host.

Act 725 includes sending, to the device, (i) the first ICV, (ii) the HPA, and (iii) the IV. For instance, that data can be sent to the device in the form of the metadata 255 of FIG. 2.

Act 730 includes receiving, from the device, a second ATS-enabled request (e.g., ATS-enabled request 435). The second ATS-enabled request comprises (i) the first ICV, (ii) the HPA, and (iii) the IV. Optionally, the second ATS-enabled request can be a request to use dynamic random access memory (DRAM), other memory, or a memory service of the ATS host.

Act 735 includes performing an inline verification (inline verification 455) of the first ICV that was received in the second ATS-enabled request. The inline verification is performed by computing a second ICV using (i) the key, (ii) the HPA received in the second ATS-enabled request, and (iii) the IV received in the second ATS-enabled request. The inline verification is further performed by comparing the second ICV against the first ICV. The inline verification is also performed by determining whether the second ICV matches the first ICV.

Optionally, the second ATS-enabled request can be performed speculatively, such as by being at least partially performed in parallel with the inline verification. If the inline verification determines that the device is authenticated, then the second ATS-enabled request can be performed to completion. On the other hand, if the inline verification determines that the device is not authenticated, then the second ATS-enabled request can be terminated, rejected, or revoked. The ATS host can then maintain an indication that the device is currently not authentic.

Consider a scenario where the second ATS-enabled request is a read request. In such a scenario, method 700 can optionally further include an act of sending the read request to the memory controller in parallel with performance of the inline verification. In response to determining that the second ICV matches the first ICV as a part of the inline verification, method 700 can further include allowing the device to access data that is read as a part of the read request. Another act includes incrementing the IV. Another act includes computing a third ICV using (i) the key, (ii) the HPA received in the second ATS-enabled request, and (iii) the incremented IV. Yet another act includes sending (i) the third ICV, (ii) the HPA, and (iii) the incremented IV to the device.

Accordingly, by performing the disclosed operations, significant improvements in computing security can be achieved. Indeed, the embodiments help prevent rogue ATS-enabled devices from being able to access resources that they should not otherwise be able to access.

Example Computer/Computer Systems

Figure 8:
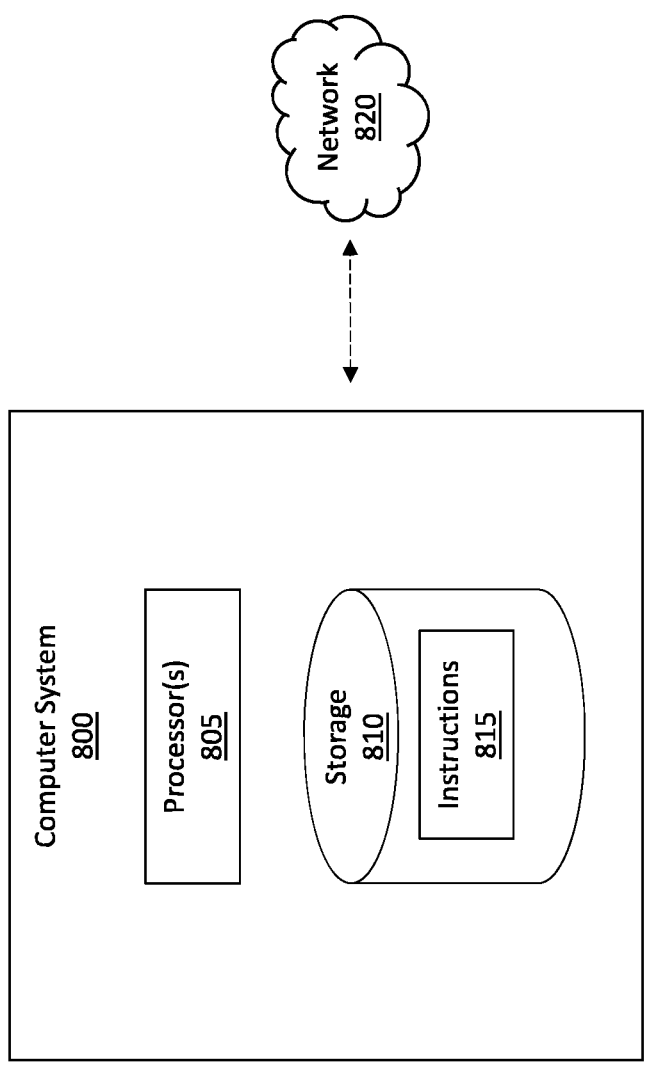
FIG. 8 illustrates an example of a computer system that can be configured to perform any of the disclosed operations.

Attention will now be directed to FIG. 8 which illustrates an example computer system 800 that may include and/or be used to perform any of the operations described herein. Computer system can be implemented as any of the PCIe devices and/or hosts mentioned herein. Computer system 800 can also perform any of the disclosed methods described herein.

Computer system 800 may take various different forms. For example, computer system 800 may be embodied as a tablet, a desktop, a laptop, a mobile device, or a standalone device, such as those described throughout this disclosure. Computer system 800 may also be a distributed system that includes one or more connected computing components/devices that are in communication with computer system 800.

In its most basic configuration, computer system 800 includes various different components. FIG. 8 shows that computer system 800 includes one or more processor(s) 805 (aka a "hardware processing unit") and storage 810.

Regarding the processor(s) 805, it will be appreciated that the functionality described herein can be performed, at least in part, by one or more hardware logic components (e.g., the processor(s) 805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 800. The different components, modules, engines, and services described herein may be implemented as objects or processors that execute on computer system 800 (e.g. as separate threads).

Storage 810 may be physical system memory, which may be volatile, non-volatile, or some combination of the two. The term "memory" may also be used herein to refer to non-volatile mass storage such as physical storage media. If computer system 800 is distributed, the processing, memory, and/or storage capability may be distributed as well.

Storage 810 is shown as including executable instructions 815. The executable instructions 815 represent instructions that are executable by the processor(s) 805 of computer system 800 to perform the disclosed operations, such as those described in the various methods.

The disclosed embodiments may comprise or utilize a special-purpose or general-purpose computer including computer hardware, such as, for example, one or more processors (such as processor(s) 805) and system memory (such as storage 810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 800 may also be connected (via a wired or wireless connection) to external sensors (e.g., one or more remote cameras) or devices via a network 820. For example, computer system 800 can communicate with any number of devices or cloud services to obtain or process data. In some cases, network 820 may itself be a cloud network. Furthermore, computer system 800 may also be connected through one or more wired or wireless networks to remote/separate computer systems(s) that are configured to perform any of the processing described with regard to computer system 800.

A "network," like network 820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 800 will include one or more communication channels that are used to communicate with network 820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing an integrity check on a device that is configured to use an address translation service (ATS) to prevent the device from maliciously using a locally cached HPA, said method being performed by the device and comprising:
   submitting a first ATS-enabled request to an ATS host, wherein the first ATS-enabled request is a request for the ATS host to translate a guest-physical address (GPA) to a host-physical address (HPA);
   receiving, from the ATS host, metadata comprising (i) a first integrity check vector (ICV) that is usable to authenticate the device, (ii) the HPA, and (iii) an initialization vector (IV);
   locally caching the metadata in an address translation cache (ATC);
   after the metadata has been cached, submitting a second ATS-enabled request to the ATS host, wherein the second ATS-enabled request comprises the metadata that was cached;
   determining, via an inline verification performed on the metadata, that the device is authenticated;
   based on a result of the inline verification that is performed on the metadata, obtaining access to a memory controller to facilitate processing of the second ATS-enabled request;
   receiving, from the ATS host, new metadata comprising (i) a new ICV that is usable to subsequently authenticate the device, (ii) the HPA, and (iii) an incremented version of the IV; and
   locally caching the new metadata in the ATC.

2. The method of claim 1, wherein the device is a peripheral component interconnect express (PCIe) device.

3. The method of claim 2, wherein the PCIe device is a single virtual function device.

4. The method of claim 2, wherein the PCIe device is a multiple virtual function device.

5. The method of claim 1, wherein the method further includes the device flushing its ATC in response to a triggering event occurring.

6. The method of claim 1, wherein the second ATS-enabled request is a read request for the memory controller.

7. The method of claim 1, wherein the second ATS-enabled request is a write request for the memory controller.

8. The method of claim 1, wherein the second ATS-enabled request is a request to access dynamic random access memory (DRAM) of the ATS host.

9. The method of claim 1, wherein the device is running at least one virtual machine (VM), and wherein the GPA is for the at least one VM.

10. A system that performs an integrity check on a peripheral component interconnect express (PCIe) device that uses an address translation service (ATS) to prevent the PCIe device from maliciously using a locally cached HPA, said system comprising:
   an ATS host; and
   the PCIe device,
   wherein the system is configured to:
      cause the PCIe device to submit a first ATS-enabled request to the ATS host, wherein the first ATS-enabled request is a request for the ATS host to translate a guest-physical address (GPA) to a host-physical address (HPA) for the PCIe device;
      cause the ATS host to translate the GPA to the HPA;
      cause the ATS host to access a key that is unique to the PCIe device;
      cause the ATS host to use (i) the key, (ii) the HPA, and (iii) an initialization vector to generate a first integrity check vector (ICV);
      cause the ATS host to send (i) the first ICV, (ii) the HPA, and (iii) the initialization vector to the PCIe device;
      cause the PCIe device to locally cache (i) the first ICV, (ii) the HPA, and (iii) the initialization vector in an address translation cache (ATC) of the PCIe device;
      after (i) the first ICV, (ii) the HPA, and (iii) the initialization vector have been cached in the ATC of the PCIe device, cause the PCIe device to trigger a second ATS-enabled request to the ATS host, wherein the second ATS-enabled request comprises (i) the first ICV that was cached in the ATC, (ii) the HPA that was cached in the ATC, and (iii) the initialization vector that was cached in the ATC;
      cause the ATS host to perform an inline verification of the first ICV that was received in the second ATS-enabled request, wherein the inline verification is performed by:
         computing a second ICV using (i) the key that is locally stored in the ATS host, (ii) the HPA received in the second ATS-enabled request, and (iii) the initialization vector received in the second ATS-enabled request;
         comparing the second ICV against the first ICV; and
         determining that the second ICV matches the first ICV such that the first ICV is considered to be verified by the ATS host;
      cause the ATS host to send the second ATS-enabled request to a memory controller for processing on behalf of the PCIe device;
      cause the ATS host to increment the initialization vector;
      cause the ATS host to compute a third ICV using (i) the key, (ii) the HPA received in the second ATS-enabled request, and (iii) the incremented initialization vector;
      cause the ATS host to send (i) the third ICV, (ii) the HPA, and (iii) the incremented initialization vector to the PCIe device; and
      cause the PCIe device to locally cache (i) the third ICV, (ii) the HPA, and (iii) the incremented initialization vector in the ATC of the PCIe device.

11. A computer system that performs an integrity check on the computer system, which is configured to use an address translation service (ATS) to prevent the computer system from maliciously using a locally cached HPA, said computer system comprising:
   one or more hardware processors; and
   one or more hardware storage devices that store instructions that are executable by the one or more hardware processors to cause the computer system to:
      submit a first ATS-enabled request to an ATS host, wherein the first ATS-enabled request is a request for the ATS host to translate a guest-physical address (GPA) to a host-physical address (HPA);
      receive, from the ATS host, metadata comprising (i) a first integrity check vector (ICV) that is usable to authenticate the computer system, (ii) the HPA, and (iii) an initialization vector (IV);
      locally cache the metadata in an address translation cache (ATC);
      after the metadata has been cached, submit a second ATS-enabled request to the ATS host, wherein the second ATS-enabled request comprises the metadata that was cached;
      determine, via an inline verification performed on the metadata, that the computer system is authenticated;
      based on a result of the inline verification that is performed on the metadata, obtain access to a memory controller to facilitate processing of the second ATS-enabled request;
      receive, from the ATS host, new metadata comprising (i) a new ICV that is usable to subsequently authenticate the computer system, (ii) the HPA, and (iii) an incremented version of the IV; and
      locally cache the new metadata in the ATC.

12. The computer system of claim 11, wherein the computer system is a peripheral component interconnect express (PCIe) device.

13. The computer system of claim 12, wherein the PCIe device is a single virtual function device.

14. The computer system of claim 12, wherein the PCIe device is a multiple virtual function device.

15. The computer system of claim 11, wherein the computer system flushes its ATC in response to a triggering event occurring.

16. The computer system of claim 11, wherein the second ATS-enabled request is a read request for the memory controller.

17. The computer system of claim 11, wherein the second ATS-enabled request is a write request for the memory controller.

18. The computer system of claim 11, wherein the second ATS-enabled request is a request to access dynamic random access memory (DRAM) of the ATS host.

19. The computer system of claim 11, wherein the computer system is running at least one virtual machine (VM), and wherein the GPA is for the at least one VM.

20. The computer system of claim 11, wherein the computer system is a peripheral component interconnect express (PCIe) device, and wherein the PCIe device is one of: a single virtual function device or a multiple virtual function device.

* * * * *